UNITED STATES PATENT OFFICE.

EDWARD KELLER, OF PERTH AMBOY, NEW JERSEY.

PROCESS FOR TREATING ANODE RESIDUES.

1,110,493.  Specification of Letters Patent.  Patented Sept. 15, 1914.

No Drawing.  Application filed April 17, 1913.  Serial No. 761,814.

*To all whom it may concern:*

Be it known that I, EDWARD KELLER, a citizen of the United States, residing at Perth Amboy, in the county of Middlesex and State of New Jersey, have invented certain new and useful Improvements in Processes of Treating Anode Residues; and I do hereby declare the following to be a full, clear, and exact description of the same.

The present invention relates to processes of treating anode residues, particularly the anode residues from electrolytic copper refineries in which there is contained precious metals, *i. e.*, gold and silver, the objects being to provide a simple, economical and practical process whereby the copper content of the residues may be saved in available form and the precious metal content more readily saved, refined and converted into doré bars for subsequent treatment to separate the gold and silver.

In accordance with the present invention the anode residues which have been freed from liquid in a filter press or by other known means, are treated with concentrated commercial sulfuric acid, preferably in quantity sufficient only to convert the copper content into sulfate of copper when the residues are heated to a high temperature, the heating being necessary to complete the reaction and reduction of copper to soluble form or sulfate of copper without the employment of an excess of acid which latter if employed would make the mass a liquid mass in which silver and impurities would be dissolved or rendered soluble. Subsequent treatment of the residues consists in extracting the sulfate of copper preferably by dissolving the same with hot water, giving a neutral and comparatively pure solution which may be returned to the electrolytic copper depositing tank and the decopperized portion of the residues treated in a furnace and refined until sufficient purity is attained for the formation of doré bars.

An excess of acid or liquid treatment as distinguished from the dry or substantially dry process of the present invention would require also that the liquid in which the copper is finally dissolved be purified before utilization in the electro deposition bath and the excess acid would have to be recovered thus increasing the cost of procedure and complicating the process.

The residues which are particularly adapted for treatment by the process of the present invention are more especially of two classes,—first, such as are derived from crude converter copper and in which the copper is in the form of sulfid and metal; and secondly, such as are derived from refined copper and in which the copper is essentially in the form of an oxid. In sulfatizing class 1, a greater quantity of sulfuric acid is necessary per unit of copper than in sulfatizing class 2. The quantity of sulfuric acid to be added for a given percentage of copper in either class is preferably established experimentally and the quantity of sulfuric acid for a changed percentage of copper in the same class of residues may be secured by proportion. An example of the actual quantity of acid used on a large scale is as follows:

*Residues of class 1.*—1 ton (2,000 lbs.) of residues (copper = 41.2%) requires 2,760 lbs. of acid 66° Baumé or 67 lbs. of acid for every unit (20 lbs.) of copper.

*Residues of class 2.*—1 ton (2,000 lbs.) of residues (copper = 15.1%) requires 460 lbs. of acid at 66° Baumé or 30.7 lbs. of acid for every unit (20 lbs.) of copper.

In carrying the process into practice the acid is preferably mixed with the residues and the residues are then subjected to a temperature of 450° F. or thereabout, preferably in a reverberatory furnace heated with oil or gas in preference to solid fuel, inasmuch as the temperature of a furnace so heated may be more readily regulated. The bottom of the furnace or the residue-supporting surface should be made of iron or steel with upturned confining edges and the heat is preferably applied over the charge rather than below, in order to avoid possible crusting on the furnace bottom or residue-supporting surface. Crusting on the surface of the charge is prevented by agitating, stirring or turning the residues.

The size or capacity of the furnace is immaterial and it may be as large or as small as is necessary to handle the quantity of material available and the material may be charged through a door or hopper into the furnace at one end and discharged therefrom at the opposite end, making a continuous operation whereby the capacity may be greatly increased.

The quantity of acid added is insufficient to render the mass liquid and the sulfatized residues discharged from the furnace are in a substantially dry condition. The sulfuric acid is mixed with the residues in a mechanical mixing device of any suitable character and the dry sulfatized residues from the baking furnace are treated with hot water in a suitable agitator for the extraction of the copper content which is made readily soluble by the process. The addition of the proper quantity of sulfuric acid will result in a copper sulfate solution which is perfectly neutral, comparatively pure and containing from 95 to 99% of the copper in the residues reduced to a soluble condition. The solution may be returned to the electrolytic copper depositing tanks, thereby avoiding any loss of the copper content. Ordinarily no silver will be found in soluble form, but should this accidentally happen, the silver content may be easily precipitated by the addition of a small quantity of untreated residues to the material undergoing treatment in the agitator.

The decopperized residues are treated by known processes in a furnace and refined until sufficient purity is attained for the formation of doré bars and the latter are then subjected to electrolytic refining, whereby the silver and gold are separated, fine silver being produced and the resulting gold residues further refined for producing fine gold.

The sulfuric acid employed is preferably the strongest commercial sulfuric acid (66° Baumé) and by the process described the copper in the anode residues is converted in the quickest possible way into soluble copper sulfate with the use of a minimum quantity of acid. Obviously, if the residues be high in copper, the acid may be added in two or more portions, whereby the residues will be prevented from foaming and caking, and owing to their comparatively dry state, the use of mechanical appliances for mixing and stirring becomes a practical possibility.

It is obvious that the particular apparatus employed is unimportant in so far as the process of the present invention is concerned, and the temperature of approximately 450° F. is subject to variation, although said temperature is preferably employed.

Having thus described my invention, what I claim as new and desire to secure by Letters Patent of the United States, is:

1. The process of treating anode residue containing copper and precious metals, which consists in adding concentrated sulfuric acid to the residue, then baking the same until substantially dry, and finally extracting the sulfate of copper formed in the process.

2. The process of treating anode residues containing copper and precious metals, which consists in adding concentrated sulfuric acid to the residues, then baking the same at a high temperature and in a substantially dry condition, and finally dissolving the sulfate of copper formed in the process and separating the undissolved residues from the solution.

3. The process of treating anode residues containing copper and precious metals, which consists in adding concentrated sulfuric acid to the residues sufficient in quantity to dampen without rendering the same fluid, and in baking the same at a temperature of approximately 450° F., and finally separating therefrom the sulfate of copper formed in the process.

4. The process of treating anode residues containing copper and precious metals, which consists in removing the liquor content from the residues, adding concentrated sulfuric acid sufficient in quantity to convert the copper content into soluble sulfate without rendering the residues liquid in character, subjecting the acid treated residues to a relatively high temperature, whereby the sulfatizing process is completed and the residues left in a substantially dry condition, and finally agitating the residues with water in the presence of heat for the extraction of the soluble copper content.

5. The process of treating anode residues containing copper and precious metals, which consists in adding concentrated sulfuric acid in quantity insufficient to render the mass liquid, then baking the mass at a relatively high temperature, and simultaneously agitating the same, and finally separating the copper and precious metal contents.

6. The process of treating anode residues containing copper and precious metals, which consists in adding concentrated sulfuric acid in quantity only sufficient to convert the copper content into soluble sulfate when subjected to a high temperature, then baking the mass at a high temperature and agitating the same to prevent crusting, then dissolving the soluble copper sulfate with water in the presence of heat, and finally separating the liquid and residues containing the precious metals.

EDWARD KELLER.

Witnesses:
KENNETH W. McCOMAS,
THOMAS J. RIGNEY.